US008553629B2

(12) United States Patent  
Kato

(10) Patent No.: US 8,553,629 B2  
(45) Date of Patent: Oct. 8, 2013

(54) TELEPHONE DEVICE AND TELEPHONE COMMUNICATION SYSTEM

(75) Inventor: Hiroshi Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 293 days.

(21) Appl. No.: 12/843,655

(22) Filed: Jul. 26, 2010

(65) Prior Publication Data

US 2011/0051653 A1 Mar. 3, 2011

(30) Foreign Application Priority Data

Aug. 28, 2009 (JP) ................................. 2009-198043

(51) Int. Cl.  
*H04W 4/00* (2009.01)

(52) U.S. Cl.  
USPC ........... 370/329; 370/319; 450/450; 450/454; 450/447

(58) Field of Classification Search  
USPC .......... 370/329, 341, 315, 343, 319; 455/464, 455/450, 509, 15  
See application file for complete search history.

(56) References Cited

U.S. PATENT DOCUMENTS

| 6,047,175 | A * | 4/2000 | Trompower ............... 455/452.1 |
| 7,324,475 | B2 * | 1/2008 | Sato et al. ..................... 370/329 |
| 2005/0143081 | A1 | 6/2005 | Stephens |
| 2006/0062235 | A1 | 3/2006 | Ginzburg |
| 2007/0066360 | A1 | 3/2007 | Sato et al. |
| 2007/0109973 | A1 | 5/2007 | Trachewsky |
| 2008/0151849 | A1 * | 6/2008 | Utsunomiya et al. ......... 370/338 |
| 2008/0161025 | A1 * | 7/2008 | Imai .............................. 455/464 |

FOREIGN PATENT DOCUMENTS

| JP | 2005-098560 A | 4/2005 |
| JP | 2006-352820 A | 12/2006 |
| JP | 2007-089069 A | 4/2007 |
| JP | 2007-116258 A | 5/2007 |
| JP | 2007-274538 A | 10/2007 |
| JP | 2008-167129 A | 7/2008 |
| JP | 2009-225048 A | 10/2009 |
| WO | 2004032550 A1 | 4/2004 |
| WO | 2007091202 A2 | 8/2007 |

OTHER PUBLICATIONS

European Patent Office; Extended European Search Report for Patent Application No. EP10 00 7252.9, dated Nov. 19, 2010. (counterpart to above-captioned U.S. patent application.  
Japan Patent Office, Notification of Reasons for Rejection for Japanese Patent Application No. 2009-198043 (counterpart Japanese patent application), mailed Apr. 9, 2013.

* cited by examiner

*Primary Examiner* — Huy D. Vu  
*Assistant Examiner* — Dady Chery  
(74) *Attorney, Agent, or Firm* — Baker Botts L.L.P.

(57) ABSTRACT

A telephone device may be configured to be connected with an access point capable of communicating wirelessly with a terminal device by using a specific bandwidth including a first bandwidth. The telephone device may comprise a first communication unit configured to communicate wirelessly with a call device by using the first bandwidth, and a second communication unit configured to communicate with the access point. The second communication unit may be configured to send, in a specific case where a specific wireless communication starts between the call device and the first communication unit, a first instruction to the access point such that the access point uses a bandwidth other than the first bandwidth.

5 Claims, 5 Drawing Sheets

TELEPHONE DEVICE AND TELEPHONE COMMUNICATION SYSTEM

CROSS-REFERENCE TO RELATED APPLICATIONS

This application claims priority to Japanese Patent Application No. 2009-198043, filed on Aug. 28, 2009, the contents of which are hereby incorporated by reference into the present application.

TECHNICAL FIELD

The technique disclosed in this specification relates to a telephone device.

DESCRIPTION OF THE RELATED ART

A domestic network system comprising a terminal device (home terminal), an access point, and a telephone device is known. The access point communicates wirelessly with the terminal device. The access point and the telephone device are configured integrally.

SUMMARY

When a telephone device (main phone) is to communicate wirelessly with a cordless call device (cordless handset), the following events may occur. Specifically, a bandwidth that is used for a wireless communication between the call device and the telephone device may overlap with a bandwidth that is used for a wireless communication between the access point and the terminal device. If the above two bandwidths overlap, the radio waves between the above two wireless communications will interfere with each other, and it may cause inconveniences such as generating noise in the call device. In particular, with the conventional system, the access point and the telephone device are configured integrally, and the access point and the telephone device are arranged in a vicinity of each other. If the access, point and the telephone device are arranged in the vicinity of each other, it is likely that interference will occur in the radio waves of the above two wireless communications. This specification provides technique that is capable of inhibiting the radio waves from interfering between a plurality of wireless communications.

One aspect of techniques disclosed in the present specification is a telephone device. The telephone device may be configured to be connected with an access point capable of communicating wirelessly with a terminal device by using a specific bandwidth including a first bandwidth. The telephone device may comprise a first communication unit configured to communicate wirelessly with a call device by using the first bandwidth, and a second communication unit configured to communicate with the access point. The second communication unit may be configured to send, in a specific case where a specific wireless communication starts between the call device and the first communication unit, a first instruction to the access point such that the access point uses a bandwidth other than the first bandwidth.

A computer program and a computer readable storage medium storing a computer program for realizing the above telephone device are also novel and useful.

DETAILED DESCRIPTION OF THE PREFERRED EMBODIMENT

First Embodiment

Configuration of System

Figure 1:
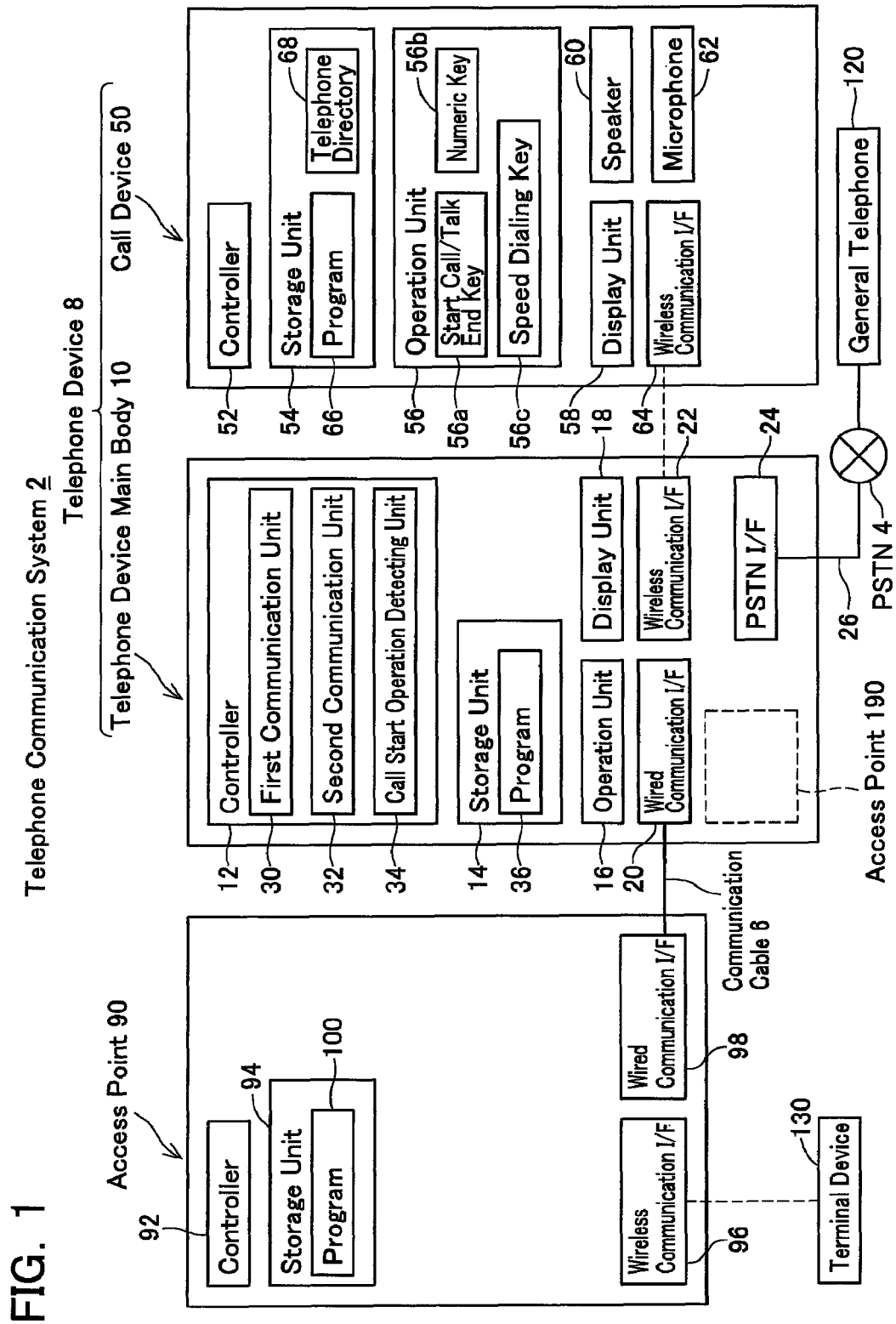
FIG. 1 shows an example of a configuration of a telephone communication system.

The first embodiment is now explained with reference to the attached drawings. As shown in FIG. 1, a telephone communication system 2 comprises a PSTN 4, a telephone device 8, an access point 90, a general telephone 120, and a terminal device 130. The telephone device 8 is a digital cordless telephone device comprising a telephone device main body 10 and a call device 50. The telephone device main body 10 and the call device 50 can mutually communicate wirelessly. The telephone device main body 10 and the general telephone 120 are both connected with the PSTN 4, and can mutually conduct telephone communication via the PSTN 4. The telephone device main body 10 and the access point 90 are connected with a communication cable 6 and mutually communicable via the communication cable 6. The access point 90 and the terminal device 130 can mutually communicate wirelessly.

(Configuration of the Telephone Device Main Body 10)

The configuration of the telephone device main body 10 is now explained. The telephone device main body 10 conducts telephone communication with the general telephone 120 via the PSTN 4. The telephone device main body 10 comprises a controller 12, a storage unit 14, an operation unit 16, a display unit 18, a wired communication interface 20, a wireless communication interface 22, and a PSTN interface 24. The controller 12 executes processes according to a program 36 stored in the storage unit 14. The respective functions of a first communication unit 30, a second communication unit 32, and a call start operation detecting unit 34 are realized as a result of the controller 12 executing processes according to the program 36. The processes to be executed by the respective components are explained in detail later.

The operation unit 16 is configured from a plurality of keys. A user is able to input various types of instructions into the telephone device main body 10 by operating the operation unit 16. The display unit 18 displays various types of information. The wired communication interface 20 is connected with the communication cable 6. The wireless communication interface 22 is an interface for communicating wirelessly with the call device 50. A PSTN line 26 is connected with the PSTN interface 24. The PSTN line 26 is connected with the PSTN 4. The telephone device main body 10 is able to conduct telephone communication, via the PSTN interface 24 and the PSTN line 26, by using the PSTN 4. An access point 190 is shown with a dotted line within the telephone device main body 10 in FIG. 1, and this access point 190 is used in the second embodiment described later.

(Configuration of the Call Device 50)

The configuration of the call device 50 is now explained. The call device 50 conducts telephone communication with the general telephone 120 via the telephone device main body 10 by communicating wirelessly with the telephone device main body 10. The call device 50 comprises a controller 52, a storage unit 54, an operation unit 56, a display unit 58, a speaker 60, a microphone 62, and a wireless communication interface 64. The controller 52 executes processes according to a program 66 stored in the storage unit 54. The storage unit 54 additionally stores a telephone directory 68. The telephone directory 68 stores a plurality of telephone identification information (telephone numbers) input by the user.

The operation unit 56 is configured from a plurality of keys. The user is able to input various types of information into the call device 50 by operating the operation unit 56. The operation unit 56 includes, e.g., a start call/talk end key 56a, a numeric key 56b, a speed dialing key 56c, etc. The display unit 58 displays various types of information. The user is able to engage in telephone communication by using the speaker 60 and the microphone 62. The wireless communication interface 64 is an interface for communicating wirelessly with the telephone device main body 10. In this embodiment, the wireless communication between the telephone device main body 10 and the call device 50 is conducted by using a bandwidth of 2.4 GHz (which may in fact be a bandwidth within a predetermined range around 2.4 GHz).

The call device 50 is in an on-hook state when it is not being used. In order to use the call device 50 and make a call, the user is required to shift the call device 50 from the on-hook state to an off-hook state. For example, the call device 50 in the on-hook state is shifted to the off-hook state by the user operating the start call/talk end key 56a. The call device 50 may also be configured capable of being set on the telephone device main body 10. In the above case, the call device 50 may be in the on-hook state when it is set on the telephone device main body 10. The call device 50 may be shifted to the off-hook state by the user raising the call device 50 from the telephone device main body 10. Meanwhile, the call device 50 in the off-hook state is shifted to the on-hook state by the user operating the start call/talk end key 56a. In the case where the call device 50 is configured capable of being set on the telephone device main body 10, the call device 50 may be shifted to the on-hook state by the user setting the call device 50 in the off-hook state on the telephone device main body 10.

When the user is to make a call with the call device 50, the user inputs the telephone identification information (PSTN telephone number) of a destination of a call request into the call device 50 by operating the numeric key 56b of the call device 50 in the off-hook state (or by operating the speed dialing key 56c). The call device 50 sends the input telephone identification information to the telephone device main body 10. The telephone device main body 10 sends the call request to the telephone device (e.g., the general telephone 120) corresponding to the telephone identification information. The user is thereby able to make the call. The user can also make a call by inputting the telephone identification information in advance and subsequently operating the start call/talk end key 56a and causing the call device 50 to shift to the off-hook state.

Meanwhile, e.g., when the general telephone 120 is used to call the telephone device 8, the telephone device main body 10 receives the call request that was sent from the general telephone 120. In the above case, the telephone device main body 10 sends a call request notice instruction to the call device 50 so that the call device 50 executes a call request notice (e.g., output of a ringtone, illumination of a lamp, etc.). Consequently, the call device 50 executes the call request notice. The user causes the call device 50 that is executing the call request notice to shift to the off-hook state e.g., by operating the start call/talk end key 56a. The user is thereby able to answer the call. In the ensuing explanation, the above operation of making a call and the operation of answering a call to be executed with the call device 50 are collectively referred to as a "call start operation."

Meanwhile, when the user wishes to hang up (end the call) while talking on the phone using the call device 50, the user causes the call device 50 to shift to the on-hook state by operating the start call/talk end key 56a while talking on the phone using the call device 50. The user is thereby able to hang up. In the ensuing explanation, the above operation of hanging up is referred to as the "call end operation."

(Configuration of the Access Point 90)

The configuration of the access point 90 is now explained. The access point 90 communicates wirelessly with the terminal device 130 (e.g., a PC or the like) existing in its periphery. The access point 90 comprises a controller 92, a storage unit 94, a wireless communication interface 96, and a wired communication interface 98. The controller 92 executes processes according to a program 100 stored in the storage unit 94. The wireless communication interface 96 is an interface for communicating wirelessly with the terminal device 130. In this embodiment, the wireless communication between the access point 90 and the terminal device 130 is conducted according to the IEEE802.11n standard. The wireless communication that is conducted between the access point 90 and the terminal device 130 uses two bandwidths; namely, 2.4 GHz (which may in fact be a bandwidth within a predetermined range around 2.4 GHz) and 5.0 GHz (which may in fact be a bandwidth within a predetermined range around 5.0 GHz). The access point 90 may communicate wirelessly with the terminal device 130 by using only either 2.4 GHz or 5.0 GHz, or communicate wirelessly with the terminal device 130 by simultaneously using both 2.4 GHz and 5.0 GHz. In a state where telephone communication is not being conducted with the call device 50, the access point 90 simultaneously uses both 2.4 GHz and 5.0 GHz and communicates wirelessly with the terminal device 130. When simultaneously using two bandwidths, the communication speed of the wireless communication between the access point 90 and the terminal device 130 is faster in comparison to the case of using only one bandwidth. The wired communication interface 98 is connected to the communication cable 6. The wired communication interface 20 of the telephone device main body 10 and the wired communication interface 98 of the access point 90 are connected via the communication cable 6, and can mutually communicate wiredly.

(Processes to be Executed by the Respective Devices)

The processes to be executed by the respective devices of the telephone communication system are now explained with reference to FIG. 2 to FIG. 5. Foremost, the process when a call request is sent from the general telephone 120 to the telephone device main body 10 is explained with reference to FIG. 2. A wireless communication 400 is being conducted between the access point 90 and the terminal device 130. The wireless communication 400 is being conducted by using both bandwidths of 2.4 GHz and 5.0 GHz. The user of the general telephone 120 inputs operations for making a call to the telephone device 8 into the general telephone 120. In this case, the general telephone 120 sends a call request 200 to the telephone device main body 10. The call request 200 that was sent from the general telephone 120 is received by the PSTN interface 24 via the PSTN 4 and the PSTN line 26 (refer to FIG. 1).

When the PSTN interface 24 receives the call request 200, the controller 12 of the telephone device main body 10 detects the call request 200 (S2). When the call request 200 is detected, the first communication unit 30 (refer to FIG. 1) of the telephone device main body 10 sends a call request notice instruction 202 to the call device 50. The call request notice instruction 202 that was sent from the telephone device main body 10 is received by the wireless communication interface 64 of the call device 50 (refer to FIG. 1).

When the wireless communication interface 64 receives the call request notice instruction 202, the controller 52 of the call device 50 detects the call request notice instruction 202 (S4). The controller 52 subsequently executes a call request notice (S6). For instance, a ringtone is output from the speaker 60. When the call request notice is made, the user of the telephone device 8 is able to know that there is a call coming in.

While the call request notice is being executed, the user of the telephone device 8 is able to execute a call start operation 206. For example, the user of the telephone device 8 causes the call device 50 to shift to the off-hook state by operating the start call/talk end key 56a of the call device 50. When the call start operation 206 is executed, the controller 52 of the call device 50 sends a call start operation notice 208 to the telephone device main body 10. The call start operation notice 208 that was sent from the call device 50 is received by the wireless communication interface 22 of the telephone device main body 10 (refer to FIG. 1).

When the wireless communication interface 22 receives the call start operation notice 208, the call start operation detecting unit 34 (refer to FIG. 1) of the telephone device main body 10 detects the call start operation notice 208 (S8). Subsequently, the second communication unit 32 (refer to FIG. 1) of the telephone device main body 10 uses the wired communication and sends a first instruction 300 to the access point 90. The first instruction 300 is an instruction for prohibiting the use of the 2.4 GHz bandwidth by the access point 90. The first instruction 300 is received by the wired communication interface 98 of the access point 90 via the communication cable 6.

When the wired communication interface 98 receives the first instruction 300, the controller 92 of the access point 90 detects the first instruction 300 (S10). Subsequently, the controller 92 executes the process for prohibiting the use of the 2.4 GHz bandwidth (S12). Specifically, the controller 92 of the access point 90 changes a predetermined flag in the storage unit 94 from a first value (e.g., "0") to a second value (e.g., "1"). In a state where the second value is stored as the above predetermined flag, the controller 92 does not use the 2.4 GHz bandwidth. Consequently, the use of the 2.4 GHz bandwidth is prohibited. For the process of S12 onward, the access point 90 conducts the wireless communication 402 with the terminal device 130 by using only the 5.0 GHz bandwidth.

After the above first instruction 300 is sent to the access point 90, the first communication unit 30 (refer to FIG. 1) of the telephone device main body 10 starts a sound data communication 210 with the call device 50 by using the 2.4 GHz bandwidth. In addition, the controller 12 of the telephone device main body 10 starts a sound data communication 212 with the general telephone 120 via the PSTN 4. As a result of the sound data communications 210, 212 being started, the telephone communication between the call device 50 and the general telephone 120 is started. Specifically, the controller 12 of the telephone device main body 10 forwards the sound data that is sent from the call device 50 to the general telephone 120, and additionally forwards the sound that is sent from the general telephone 120 to the call device 50.

Figure 3:
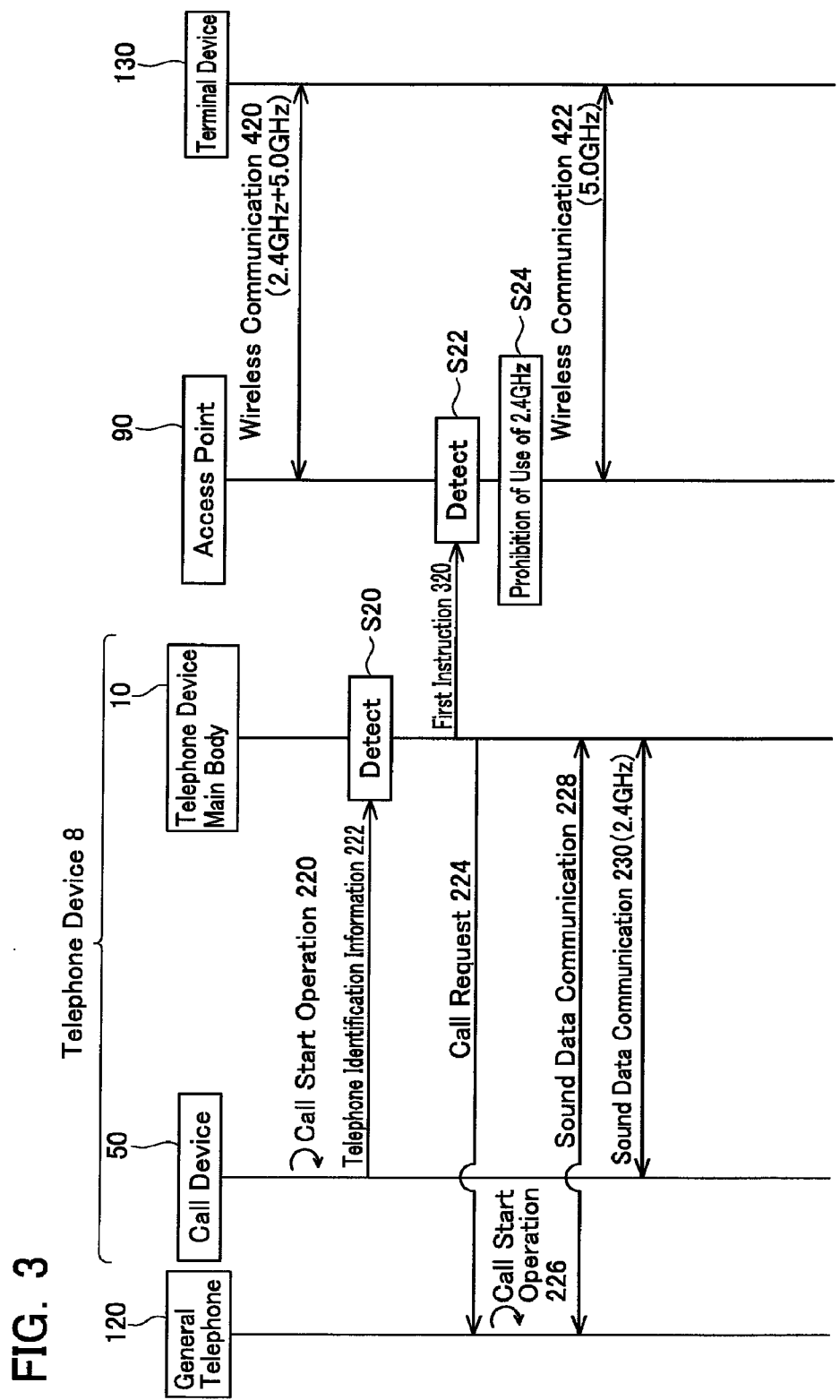
FIG. 3 shows a sequence diagram from sending of a call request to the start of the call.

The process when the call start operation is executed by the call device 50 is now explained with reference to FIG. 3. As shown in FIG. 3, a wireless communication 420 is being conducted between the access point 90 and the terminal device 130 by using both bandwidths of 2.4 GHz and 5.0 GHz. The user of the telephone device 8 operates the call device 50 and executes a call start operation 220 for calling the general telephone 120. For example, the user of the telephone device 8 foremost operates the start call/talk end key 56a of the call device 50 to cause the call device 50 to shift to the off-hook state, and subsequently operates the numeric key 56b (or operates the speed dialing key 56c) to input the telephone identification information of the general telephone 120 into the call device 50. The controller 52 of the call device 50 in which the call start operation 220 was executed sends the telephone identification information 222 that was input with the call start operation 220 to the telephone device main body 10. The telephone identification information 222 that was sent from the call device 50 is received by the wireless communication interface 22 of the telephone device main body 10.

When the wireless communication interface 22 receives the telephone identification information 222, the call start operation detecting unit 34 (refer to FIG. 1) of the telephone device main body 10 detects the telephone identification information 222 (S20). Subsequently, the second communication unit 32 (refer to FIG. 1) of the telephone device main body 10 uses wired communication to send a first instruction 320 to the access point 90. The first instruction 320 is an instruction that is the same as the first instruction 300 of FIG. 2. As with S10 and S12 of FIG. 2, the access point 90 detects the first instruction 320 (S22), and executes a process for prohibiting the use of the 2.4 GHz bandwidth (S24). For the process of S24 onward, the access point 90 conducts a wireless communication 422 with the terminal device 130 by using only the 5.0 GHz bandwidth.

After the first instruction 300 has been sent to the access point 90, the controller 12 of the telephone device main body 10 sends a call request 224 to the general telephone 120 via the PSTN 4. Consequently, the call request notice (e.g., output of a ringtone) is executed in the general telephone 120. When a call start operation 226 is executed in the general telephone 120, the controller 12 of the telephone device main body 10 starts a sound data communication 228 with the general telephone 120 via the PSTN 4. In addition, the first communication unit 30 (refer to FIG. 1) of the telephone device main body 10 starts a sound data communication 230 with the call device 50 by using the 2.4 GHz bandwidth. As a result of the sound data communications 228, 230 being started, the telephone communication between the call device 50 and the general telephone 120 is started.

The process when a call end operation is executed in the call device 50 in a state where the telephone communication between the call device 50 and the general telephone 120 is being conducted is now explained with reference to FIG. 4. As explained with reference to FIG. 2 and FIG. 3, a sound data communication 240 is being conducted between the call device 50 and the first communication unit 30 of the telephone device main body 10 by using the 2.4 GHz bandwidth, and a sound data communication 242 is being conducted between the telephone device main body 10 and the general telephone 120 via the PSTN 4. In addition, a wireless communication 440 is being conducted between the access point 90 and the terminal device 130 by using only the 5.0 GHz bandwidth.

The user of the telephone device 8 executes a call end operation 244 in the call device 50. For example, the user of the telephone device 8 operates the start call/talk end key of the operation unit 56 of the call device 50 to cause the call device 50 to shift to the on-hook state. The controller 52 of the call device 50 in which the call end operation 244 was executed sends a call end instruction 246 to the telephone device main body 10. The call end instruction 246 that was sent from the call device 50 is received by the wireless communication interface 22 of the telephone device main body 10.

When the wireless communication interface 22 receives the call end instruction 246, the controller 12 of the telephone device main body 10 detects the call end instruction 246 (S30). In this case, the first communication unit 30 of the telephone device main body 10 ends the sound data communication 240 that was being conducted with the call device 50. Subsequently, the controller 12 of the telephone device main body 10 sends a hang up notice 248 to the general telephone 120. Consequently, the sound data communication 242 that was being conducted between the telephone device main body 10 and the general telephone 120 is ended, and the telephone communication that was being conducted between the call device 50 and the general telephone 120 is ended. Subsequently, the second communication unit 32 (refer to FIG. 1) of the telephone device main body 10 uses the wired communication to send a second instruction 340 to the access point 90. The second instruction 340 is an instruction for permitting the access point 90 to use the 2.4 GHz bandwidth. The second instruction 340 is received by the wired communication interface 98 of the access point 90 via the communication cable 6.

The controller 92 of the access point 90 detects the second instruction 340 (S32). In this case, the controller 92 executes a process for once again using the 2.4 GHz bandwidth (S34). Specifically, the controller 92 of the access point 90 changes the above predetermined flag in the storage unit 94 from the second value to the first value. In a state where the first value is stored as the above predetermined flag, the controller 92 uses both bandwidths of 2.4 GHz and 5.0 GHz. Consequently, the 2.4 GHz bandwidth is used once again. For the process of S34 onward, the access point 90 conducts a wireless communication 442 with the terminal device 130 by using both bandwidths of 2.4 GHz and 5.0 GHz.

The process in a case where a call end operation is executed by the general telephone 120 in a state that a telephone communication between the call device 50 and the general telephone 120 is being conducted is now explained with reference to FIG. 5. Sound data communications 260, 262 and a wireless communication 460 are the same as the sound data communications 240, 242 and the wireless communication 440 of FIG. 4.

The user of the general telephone 120 executes a call end operation 264 with the general telephone 120. In this case, the general telephone 120 sends a hang up notice 266 to the telephone device main body 10. The hang up notice 266 that is sent from the general telephone 120 is received by the PSTN interface 24 via the PSTN 4 and the PSTN line 26.

When the PSTN interface 24 receives the hang up notice 266, the telephone device main body 10 detects the hang up notice 266 (S40). In this case, the first communication unit 30 of the telephone device main body 10 ends the sound data communication 260 that is being conducted with the call device 50. Subsequently, the second communication unit 32 (refer to FIG. 1) of the telephone device main body 10 uses wired communication to send a second instruction 360 to the access point 90. The second instruction 360 is an instruction that is the same as the second instruction 340 of FIG. 4. As with S32 and S34 of FIG. 4, the controller 92 of the access point 90 detects the second instruction 360 (S42), and executes a process for using the 2.4 GHz bandwidth once again (S44). For the process of S44 onward, the access point 90 conducts the wireless communication 462 with the terminal device 130 by using both bandwidths of 2.4 GHz and 5.0 GHz.

Figure 2:
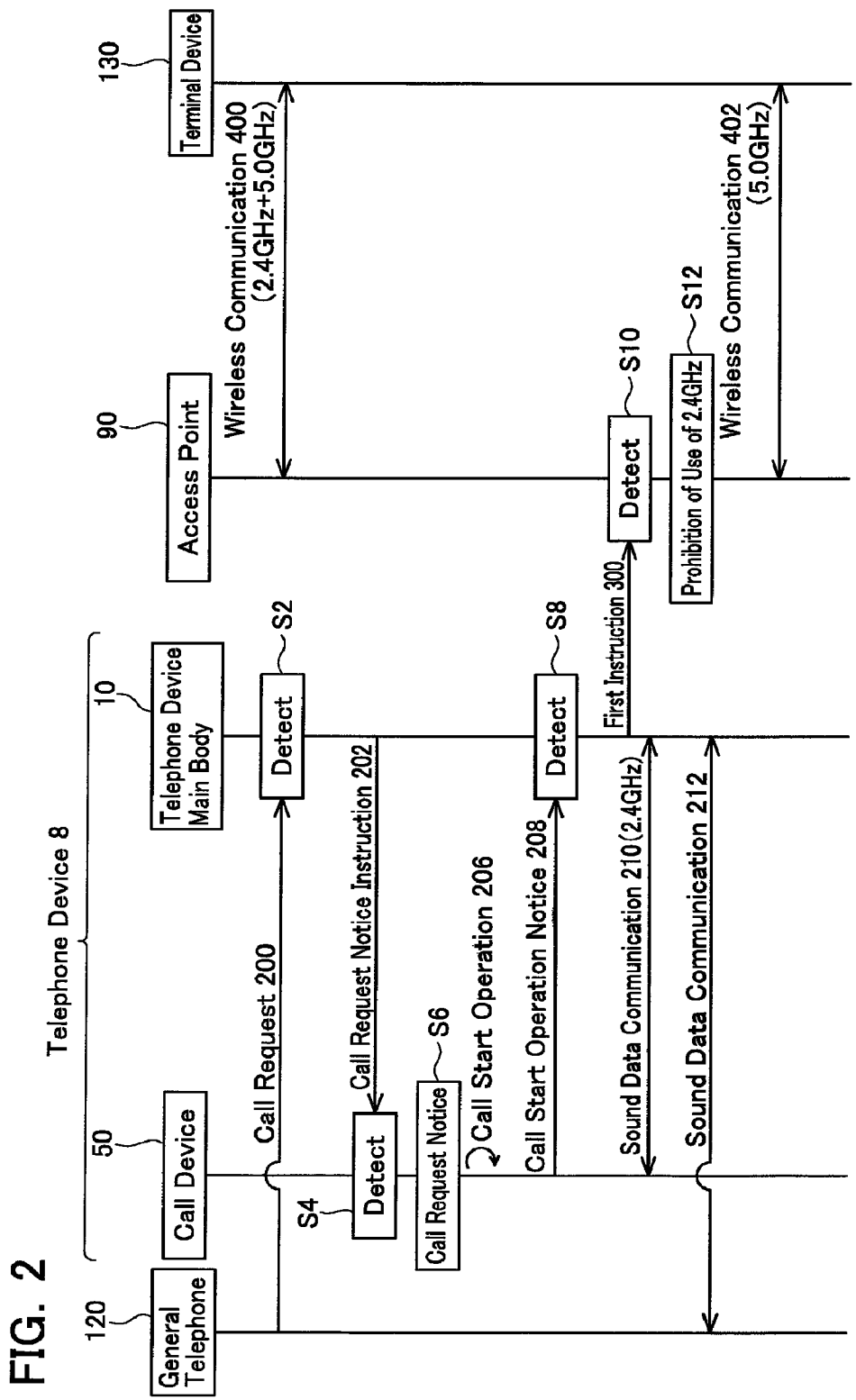
FIG. 2 shows a sequence diagram from reception of a call request to start of the call.

The first embodiment was explained in detail above. As shown in FIG. 2 and FIG. 3, when the call start operation detecting unit 34 of the telephone device main body 10 detects the call start operation notice 208 or the telephone identification information 222, the second communication unit 32 of the telephone device main body 10 sends the first instruction 300 (320) to the access point 90 for prohibiting the use of the 2.4 GHz bandwidth. Consequently, it is possible to prevent the bandwidth (2.4 GHz) of the sound data communication 210 (230) between the call device 50 and the telephone device main body 10 from overlapping with the bandwidth (5.0 GHz) of the wireless communication 402 (422) that is conducted between the access point 90 and the terminal device 130. It is possible to prevent the interference of radio waves between the sound data communication 210 (230) and the wireless communication 402 (422). It is possible to inhibit the generation of noise while engaging in telephone communication using the call device 50.

Figure 4:
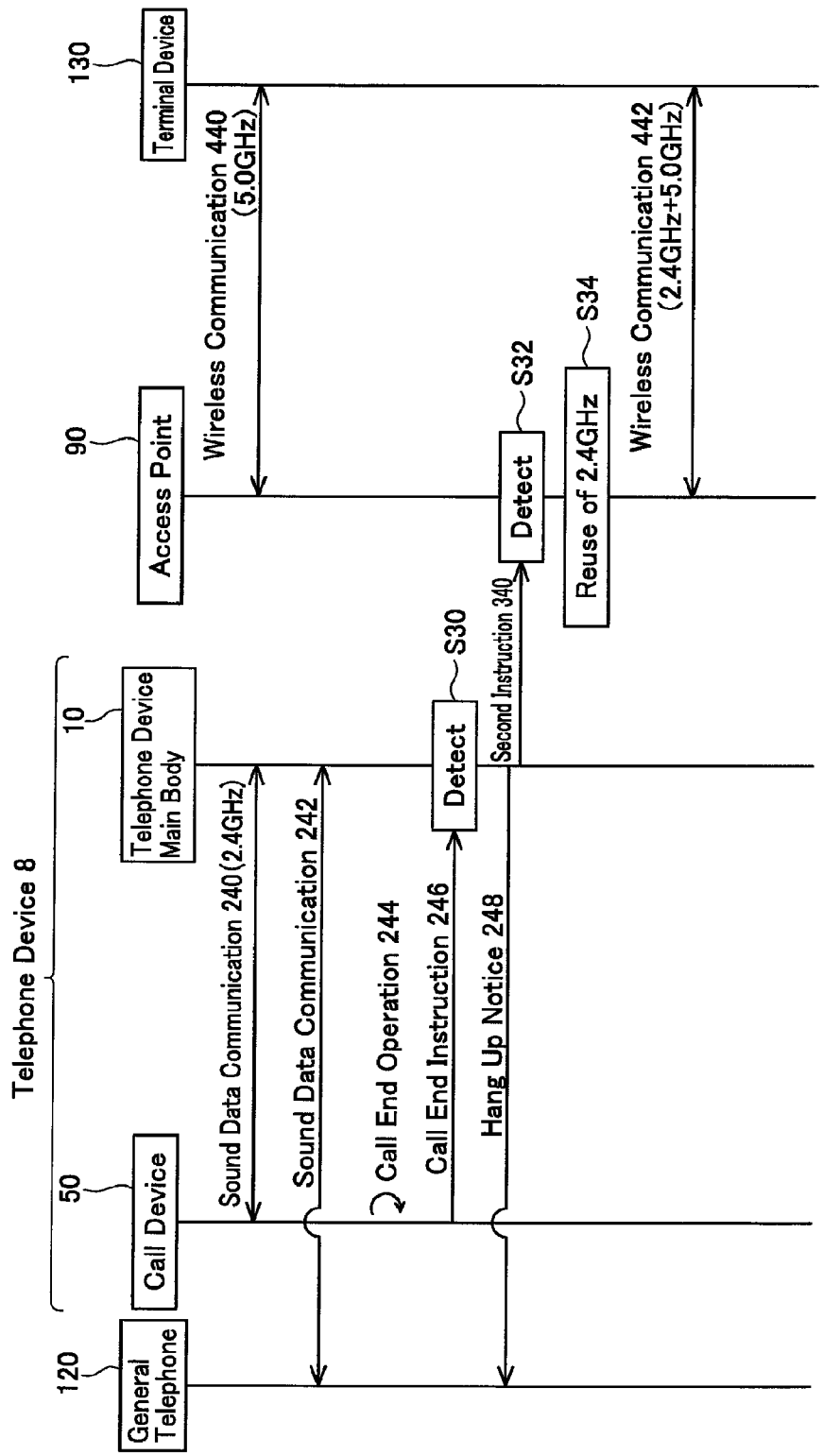
FIG. 4 shows a sequence diagram from a call connected state to sending of a hang up notice.
Figure 5:
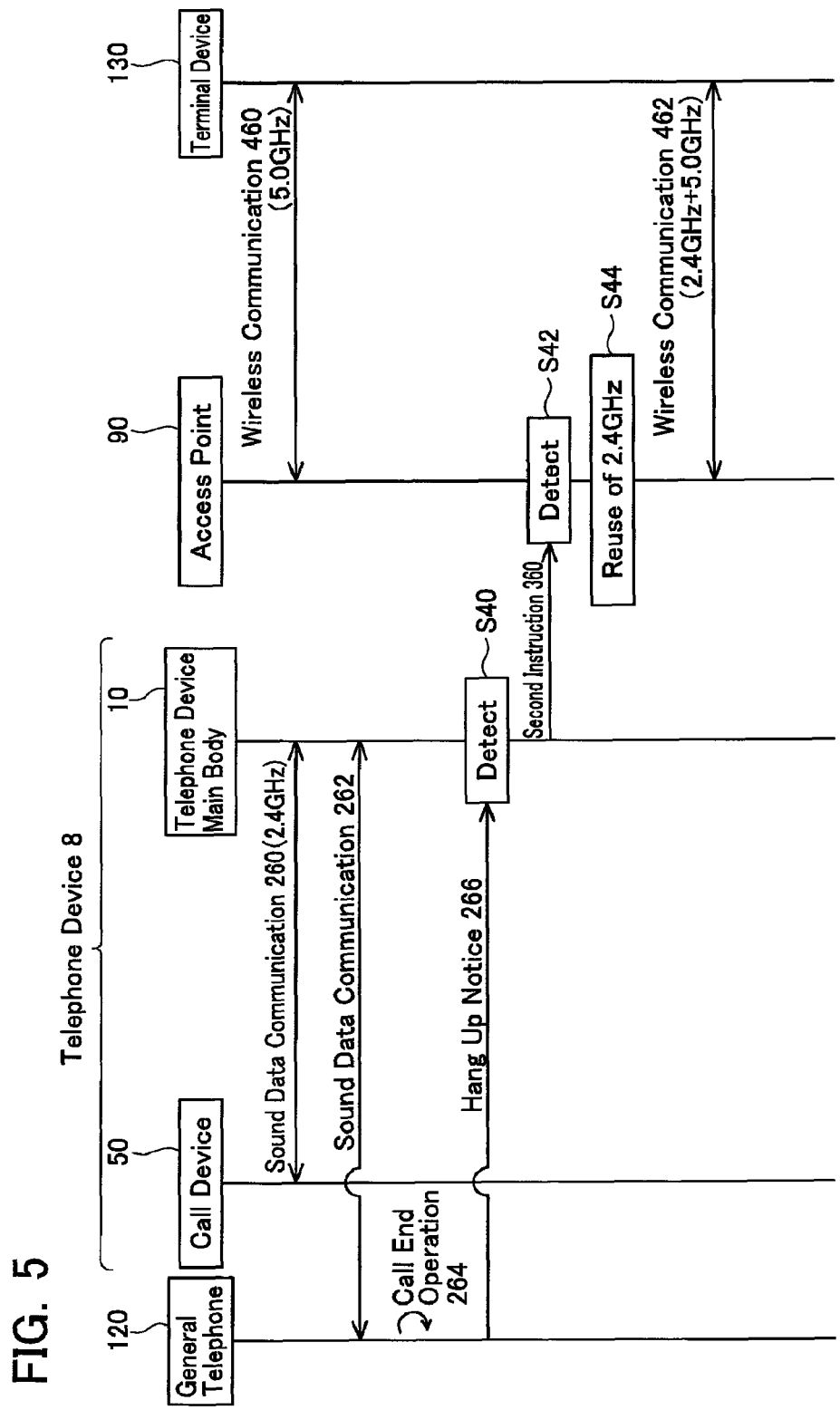
FIG. 5 shows a sequence diagram from the call connected state to reception of a hang up notice.

In addition, as shown in FIG. 4 and FIG. 5, the second communication unit 32 of the telephone device main body 10 sends the second instruction 340 (360) to the access point 90 so that the access point 90 is able to reuse the 2.4 GHz band once again when the sound data communication 240 (260) that is being conducted between the call device 50 and the first communication unit 30 of the telephone device main body 10 is ended. Consequently, the access point 90 is able to conduct the wireless communication 442 (462) by simultaneously using both bandwidths of 2.4 GHz and 5.0 GHz. Since the sound data communication 240 (260) has ended, radio wave interference will not occur. Moreover, the access point 90 is able to conduct the wireless communication with the terminal device 130 at a faster communication speed in comparison to the case of using only the 5.0 GHz bandwidth.

In addition, the telephone device main body 10 is connected wiredly with the access point 90. Thus, communication between the telephone device main body 10 and the access point 90 will not interfere with the radio wave of the wireless communication between the telephone device main body 10 and the call device 50, and the radio wave of the wireless communication between the access point 90 and the terminal device 130.

Moreover, in this embodiment, after the first instruction 300 (320) has been sent to the access point 90, the first communication unit 30 starts the sound data communication 210 (213) with the call device 50. The sound data communication 210 (213) is thereby started after the bandwidth to be used by the access point 90 is limited to only the 5.0 GHz. It is possible to prevent the interference of radio waves between the sound data communication 210 (230) and the wireless communication 402 (422). Moreover, the access point 90 is able to use the 2.4 GHz and 5.0 GHz bandwidths to conduct high-speed wireless communication with the terminal device 130 until receiving the first instruction 300 (320). Specifically, by restricting the bandwidth that is used by the access point 90 at an appropriate timing, it is possible to prevent the interference of radio waves between the sound data communication 210 (230) and the wireless communication 402 (422), and optimally maintain the wireless communication speed between the access point 90 and the terminal device 130. It is possible to maintain a favorable wireless communication environment by realizing both the prevention of radio wave interference and the maintenance of optimal wireless communication speed.

As evident from the above explanation, the telephone device main body 10 is an example of a "telephone device." 2.4 GHz and 5.0 GHz are examples of a "first bandwidth" and a "second bandwidth" respectively. Moreover, the two bandwidths of 2.4 GHz and 5.0 GHz are examples of a "specific bandwidth." The sound data communications 210, 230 are examples of a "specific wireless communication." Incidentally, when the call start operation detecting unit 34 detects the call start operation notice 208 in this embodiment (refer to S8 of FIG. 2), and when the call start operation detecting unit 34 detects the telephone identification information 222 (refer to S20 of FIG. 3), both cases are examples of "in the specific case where the execution of the call start operation is detected.". The telephone device main body 10 is an example of a "main phone." The call device 50 is an example of a "cordless handset."

Second Embodiment

The second embodiment is now explained. In this embodiment, as shown in FIG. 1, the access point 190 (refer to section indicated with a dotted line) and the telephone device main body 10 are configured integrally. Specifically, the access point 190 is disposed in a casing (not shown) of the telephone device main body 10. The access point 190 has the same configuration and function as the access point 90 of the first embodiment. The access point 190 and the second communication unit 32 of the telephone device main body 10 are connected in a mutually communicable manner with a hub (not shown) provided within the telephone device main body 10. According to this embodiment, the power source of the access point 190 and the power source of the telephone device main body 10 can be integrated. In this embodiment also, the telephone device main body 10 sends the first instruction and the second instruction to the access point 190. The access point 190 changes the bandwidth for communicating wirelessly with the terminal device 130 according to the first instruction and the second instruction.

The modified examples of each of the above embodiments are listed below.

(1) The second communication unit 32 may send the first instruction at a timing that is different from each of the above embodiments. For example, the second communication unit 32 may send the first instruction 300 to the access point 90 at a timing that is after the controller 12 of the telephone device main body 10 detects the call request 200 and before the first communication unit 30 of the telephone device main body 10 sends the call request notice instruction 202. Moreover, the second communication unit 32 may send the first instruction 300 to the access point 90 at a timing that is after the first communication unit 30 sends the call request notice instruction 202 and before the controller 12 of the telephone device main body 10 detects the call start operation notice 208. This modified example is also included in the configuration of "wherein the second communication unit is configured to send, in a specific case where a specific wireless communication starts between the call device and the first communication unit, a first instruction to the access point such that the access point uses a bandwidth other than the first bandwidth."

(2) The first communication unit 30 may also end the sound data communication that is being conducted with the call device 50 when an incommunicable state between the telephone device main body 10 and the general telephone 120 continues for a predetermined time (timeout).

(3) A wired call device may be additionally connected to the telephone device main body 10. When a call start operation is executed with the wired call device, the second communication unit 32 is not required to send the first instruction to the access point 90.

(4) The telephone device main body 10 and the access point 90 may be configured to enable mutual wireless communication.

(5) In each of the above embodiments, the wireless communication between the access point 90 and the terminal device 130 is conducted according to the IEEE802.11n standard by using the two bandwidths of 2.4 GHz and 5.0 GHz. Nevertheless, the bandwidth to be used in the wireless communication between the access point 90 and the terminal device 130 is not limited to the above. For example, the wireless communication between the access point 90 and the terminal device 130 may be a wireless communication that is able to use any band between 2.0 and 5.0 GHz. In this case, if the call device 50 and the first communication unit 30 are to communicate wirelessly, the second communication unit 32 sends a first instruction to the access point 90 for prohibiting the use of the 2.4 GHz band. The access point 90 of this modified example is also included in the configuration of "an access point capable of communicating wirelessly with a terminal device by using a specific bandwidth including a first bandwidth."

(6) The telephone device main body 10 is a PSTN telephone device that uses the PSTN 4, but it may alternately be an IP telephone device that uses an IP network.

(7) The "operation of making a call" as the "call start operation" may alternately be an operation of simply realizing an off-hook state.

(8) The telephone device 8 is not limited to the above, and may e.g. be a facsimile device comprising a telephone function and a facsimile function. In this case, even when an operation for forwarding the facsimile data that was received by the facsimile device main body to the call device as the cordless handset or an operation for sending the facsimile data to be sent from the call device to the facsimile device main body is performed based on the facsimile function, the bandwidth to be used by the access point may be restricted as with the case of the call start operation being performed.

(9) In each of the above embodiments, the respective functions of a first communication unit 30, a second communication unit 32, and a call start operation detecting unit 34 are realized as a result of the controller 12 executing processes according to the program 36. However, all of or a part of the above functions may be realized by hardware such as logical circuits.

What is claimed is:

1. A telephone device comprising:
   a telephone device main body with an access point configured integrally therewith; and
   a call device configured as a cordless handset of the telephone device main body, wherein:
   a wireless communication between the access point and a terminal device is conducted according to the IEEE802.11n standard;
   the access point and the terminal device are configured to communicate with each other by using a first bandwidth of 2.4 GHz;
   the access point and the terminal device also are configured to communicate with each other by using a second bandwidth of 5.0 GHz;
   the telephone device is configured to be connected with an external telephone device via a PSTN;
   the telephone device main body and the call device are configured to communicate with each other by using the first bandwidth when the call device communicates with the external telephone device via the telephone device main body;

the telephone device main body and the call device are not configured to communicate with each other using the second bandwidth;

the telephone device main body comprises:
- a first communication unit configured to communicate wirelessly with the call device by using the first bandwidth,
- a second communication unit configured to communicate with the access point, and
- a call start operation detecting unit configured to detect an execution of a call start operation on the call device; and when a specific wireless communication using the first bandwidth starts between the call device and the telephone device main body due to the execution of the call start operation being detected, the second communication unit is configured to send a first instruction to the access point to limit a bandwidth used by the access point to the second bandwidth, and the bandwidth used by the access point is not limited to the second bandwidth when the specific wireless communication using the first bandwidth is not conducted between the call device and telephone device main body.

2. The telephone device as in claim 1, wherein the call start operation is an operation for shifting the call device from an on-hook state to an off-hook state.

3. The telephone device as in claim 1, wherein the second communication unit is configured to send, in a case where the specific wireless communication has ended between the call device and the first communication unit after the first instruction had been sent, a second instruction to the access point such that the access point reuses the first bandwidth.

4. The telephone device as in claim 1, wherein the specific wireless communication includes a wireless communication of sound data, and the first communication unit is configured to start the wireless communication of the sound data with the call device after the first instruction has been sent.

5. A non-transitory computer readable storage medium storing a computer program for a telephone device that is connected with an external telephone device via a PSTN and that comprises a telephone device main body with an access point configured integrally therewith and a call device configured as a cordless handset of the telephone device main body, wherein the telephone device main body and the call device are not configured to communicate with each other using a bandwidth of 5.0 GHz and the computer program comprises instructions for ordering a computer mounted on the telephone device to execute:

detecting an execution of a call start operation on the call device, communicating wirelessly between the telephone device main body and the call device using a bandwidth of 2.4 GHz when the call device communicates with the external telephone device via the telephone device main body;

sending a first instruction to the access point to limit a bandwidth used by the access point to the bandwidth of 5.0 GHz when wireless communications start between the telephone device main body and the call device due to the execution of the call start operation being detected, the wireless communications between the telephone device main body and the call device using the bandwidth of 2.4 GHz; and communicating wirelessly between the access point and a terminal device according to the IEEE802.11n standard using the bandwidth of 2.4 GHz based on the first instruction, wherein the access point and the terminal device are configured to communicate with each other using at least one of the bandwidth of 2.4 GHz and the bandwidth of 5.0 GHz, and when the wireless communication between the telephone device main body and the call device using the bandwidth of 5.0 GHz is not conducted, the bandwidth used for the communication between the access point and the terminal device is not limited to the bandwidth of 2.4 GHz.

* * * * *